(12) United States Patent
Kobayashi

(10) Patent No.: US 6,252,628 B1
(45) Date of Patent: Jun. 26, 2001

(54) ZOOM FINDER

(75) Inventor: Hideo Kobayashi, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 08/978,150

(22) Filed: Nov. 25, 1997

(30) Foreign Application Priority Data

Nov. 27, 1996 (JP) .................................................. 8-316282

(51) Int. Cl.[7] ............................ G03B 17/00; G03B 13/10; H04N 5/225
(52) U.S. Cl. ............................ 348/358; 348/341; 396/379
(58) Field of Search .................................... 348/341, 358, 348/375; 396/379, 382, 373; 359/379, 380, 676, 694, 700, 701

(56) References Cited

U.S. PATENT DOCUMENTS

| | | | |
|---|---|---|---|
| 5,678,090 | * | 10/1997 | Nishimura et al. ............... 396/379 |
| 5,778,262 | * | 7/1998 | Kobayashi et al. ............... 396/379 |
| 5,848,302 | * | 12/1998 | Machida ............................... 396/379 |
| 5,884,106 | * | 3/1999 | Manabe ................................ 396/379 |

* cited by examiner

*Primary Examiner*—Wendy R. Garber
*Assistant Examiner*—Luong Nguyen
(74) *Attorney, Agent, or Firm*—Birch, Stewart, Kolasch & Birch, LLP

(57) ABSTRACT

A zoom finder which changes a magnification of a finder image by moving two movable lenses in a variable magnification optical system of the zoom finder in a certain relation. Each movable lens is provided with a guide hole and a cam follower at an end and a engaging part at the opposite end. A guide shaft is inserted in the guide holes of the movable lenses. A rotation preventive member engages with the engaging parts of the movable lenses. The cam followers of the movable lenses are pressed against two cam faces of a finder cam. At least one of the two cam faces inclines over the whole area for use to one side with respect to a direction in which a pressing force of the pressing member is applied to the cam follower which is in contact with the cam face.

11 Claims, 6 Drawing Sheets

F I G. 1
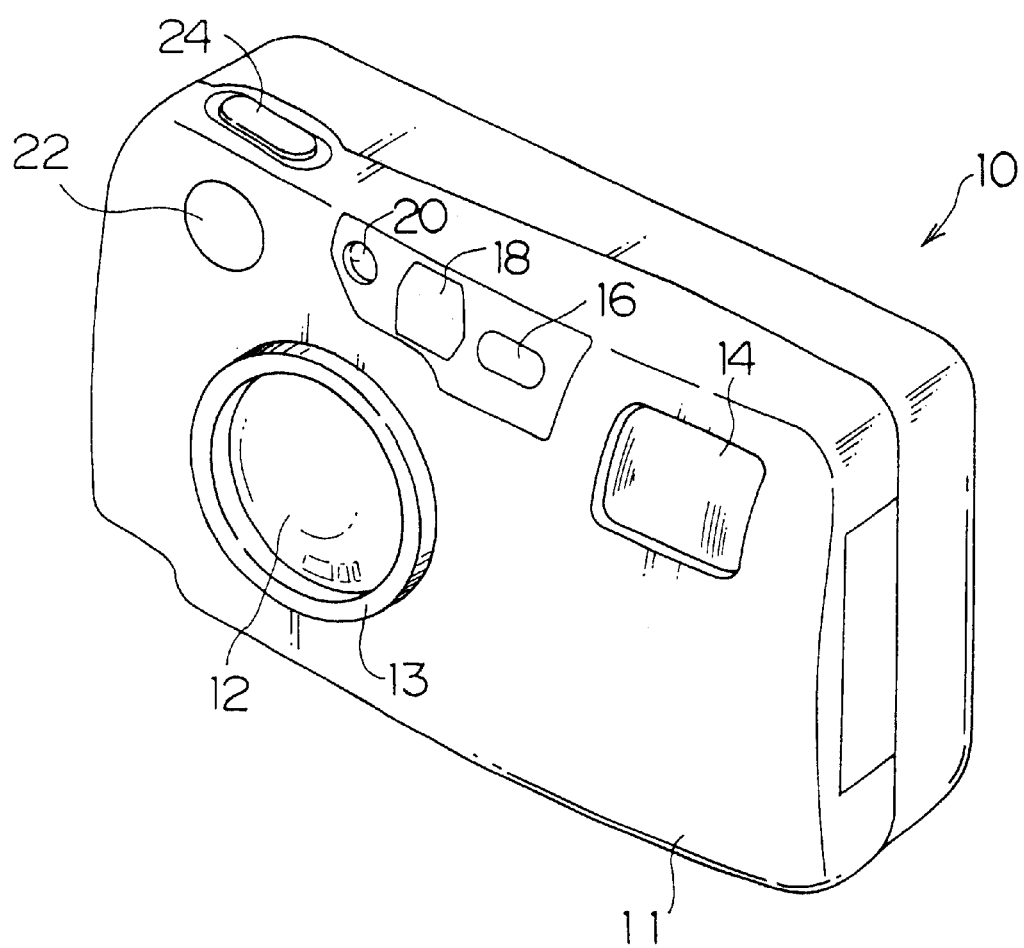

F I G. 2
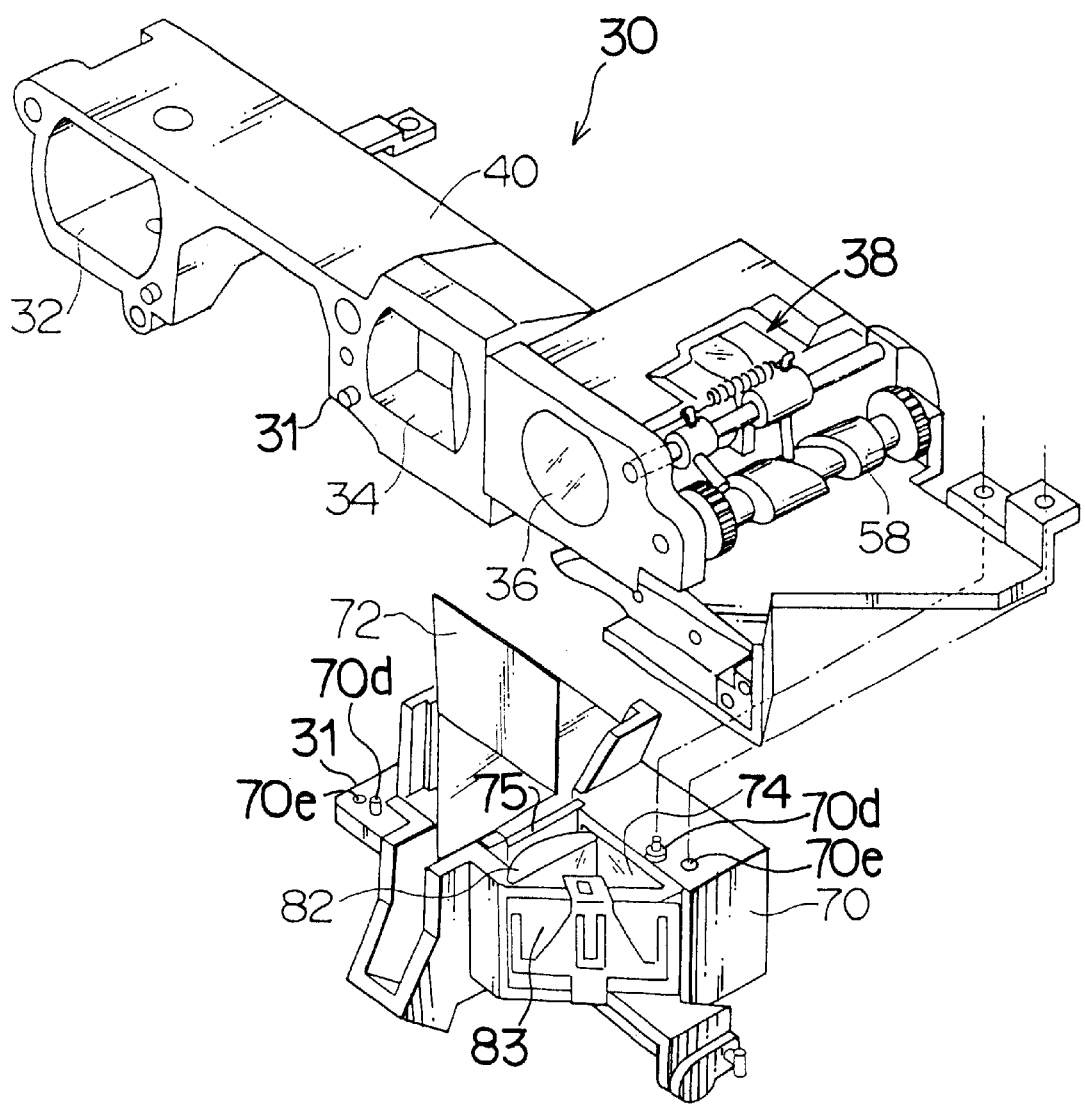

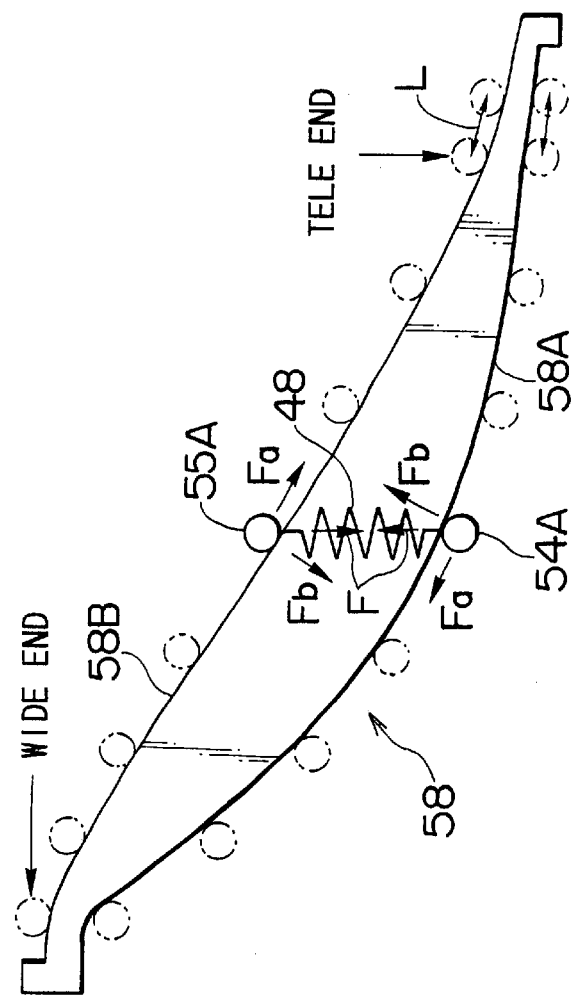
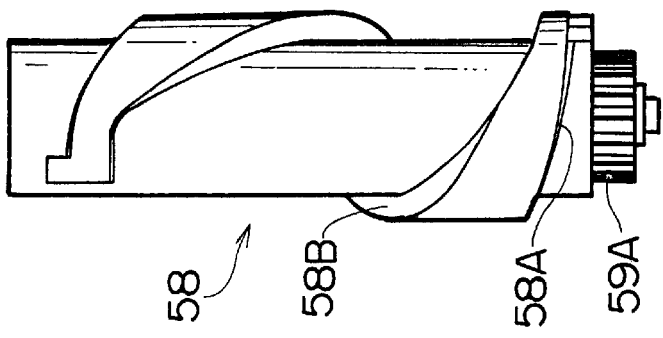

ZOOM FINDER

BACKGROUND OF THE INVENTION

1. Field of the Invention

The present invention relates generally to a zoom finder, and more particularly to a zoom finder which is able to prevent an image from shifting.

2. Description of Related Art

A conventional zoom finder has a finder optical system which is composed of an objective lens including two movable lenses, an erecting optical system, an eyepiece, etc. One end of both movable lenses is supported movably along the optical axis by a guide shaft, and the opposite end of both movable lenses engages with a rotation preventive member. The movable lenses are pressed by a spring so that cam followers provided at the movable lenses can be in contact with cam faces of a finder cam. Thus, by driving the finder cam, the two movable lenses are moved along the optical axis in a certain relation to thereby change a magnification of the zoom finder.

When the two movable lenses are moved by driving the finder cam, a frictional force is produced between the cam face of the finder cam and the cam follower of the movable lens. The frictional force acts on the cam follower so as to rotate the movable lens around the guide shaft. Although one end of the movable lens engages with the rotation preventive member, the movable lens is rotated a little by the frictional force since there is some play between them. When the driving directions of the finder cam are switched, the directions of the frictional force are also switched, and then the rotational directions of the movable lens are switched. Thus, the conventional zoom finder has a problem in that the image observed through the finder shifts whenever the driving directions of the finder cam are switched, as a result of the shifts of the movable lenses.

SUMMARY OF THE INVENTION

The present invention has been developed in view of the above-described circumstances, and has as its object the provision of a zoom finder which is able to easily prevent the image from shifting without increasing the number of parts.

To achieve the above-mentioned object, a zoom finder of the present invention comprises: first and second movable lenses composing a variable magnification optical system of the zoom finder, each of the first and second movable lenses being provided with a guide hole, an engaging part and a cam follower; a guide shaft for supporting the first and second movable lenses movably along an optical axis of the variable magnification optical system, the guide shaft being arranged parallel to the optical axis and being inserted into the guide holes of the first and second movable lenses; a rotation preventive member for preventing the first and second movable lenses from rotating around the guide shaft by engaging with the engaging parts of the first and second movable lenses, the rotation preventive member being arranged parallel to the optical axis; a finder cam for moving the first and second movable lenses along the optical axis by moving first and second cam faces which are provided at the finder cam and are respectively in contact with the cam followers of the first and second movable lenses; a pressing member for pressing the cam followers of the first and second movable lenses against the first and second cam faces of the finder cam; and the zoom finder is characterized in that at least one of the first and second cam faces of the finder cam inclines, over the whole area for use, to one side with respect to a direction in which a pressing force of the pressing member is applied to the cam follower of at least one of the first and second movable lenses which is in contact with the at least one of the first and second cam faces, so that the engaging part of the at least one of the first and second movable lenses can always be in contact with the rotation preventive member by operation of a component of the pressing force of the pressing member in a direction of a tangent line of the at least one of the first and second cam faces at a point where the at least one of the first and second cam faces is in contact with the cam follower of the at least one of the first and second movable lenses.

According to the present invention, the cam face of the finder cam inclines, over the whole area for use, to one side with respect to the direction of the pressing force of the pressing member applied to the cam follower which is in contact with the cam face. Thereby, the component of the pressing force in the direction of the tangent line of the cam face at the point where the cam face is in contact with the cam follower, which component acts on the cam follower so as to rotate the movable lens around the guide shaft, is always directed to one side. By making the component of the pressing force larger than the frictional force which is produced between the cam face and the cam follower when the cam face moves, a rotational force which is always directed to one side can be applied to the movable lens, and then the engaging part of the movable lens can always be in contact with a regulating face of the rotation preventive member. Consequently, the movable lenses can be prevented from rotating, and thus the image can be prevented from shifting.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view illustrating the appearance of a camera in which the zoom finder of the present invention is incorporated;

FIG. 2 is a perspective view of the zoom finder which is incorporated into the camera in FIG. 1;

FIGS. 5 (A) and 5 (B) are a plan view and a development view, respectively, of a finder cam.

DETAILED DESCRIPTION OF THE PREFERRED EMBODIMENTS

Figure 3:
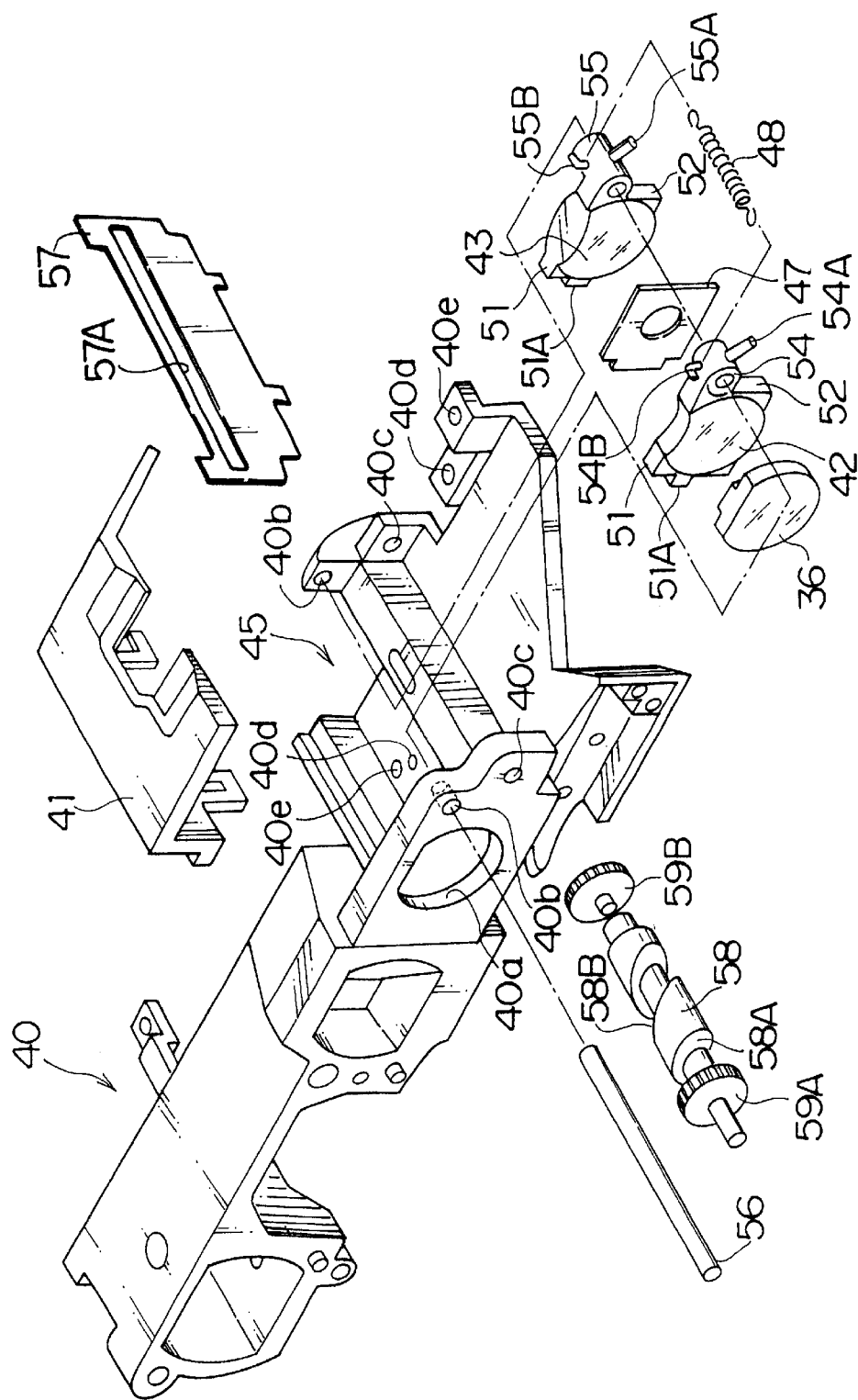
FIG. 3 is an exploded perspective view of the first block which composes the zoom finder in FIG. 2.

This invention will be described in further detail by way of example with reference to the accompanying drawings.

FIG. 1 is a perspective view illustrating the appearance of the camera in which the zoom finder of the present invention is incorporated. A lens barrel 13 is attached to the center of the front face of an outer casing 11 of the camera 10 in FIG. 1, and a taking lens 12 is incorporated into the lens barrel 13. A strobe window 14 is formed at the upper right corner of the front face of the outer casing 11, and a finder objective window 16, an AF light-projector window 18, an photometry window 20, and an AF light-acceptor window 22 are formed in order at the left side of the strobe window 14. A shutter button 24 is provided at the top of the camera 10.

A shutter (not shown) is arranged on the optical axis of the taking lens 12 in the camera 10, and the shutter moves in association with the operation of the shutter button 24.

An AF light-projecting part is provided on the inside of the AF light-projector window 18, and an AF light-accepting part is provided on the inside of the AF light-acceptor window 22. The light projecting and accepting parts compose an automatic focusing (AF) part for measuring a subject distance based on, for example, the principle of triangulation. The results of the measurement are used to control an automatic focusing (AF control.)

A lens (not shown) through which the external light enters, and a photometry part, which is composed of a light accepting element provided at an image forming position of the lens, are provided on the inside of the photometry window 20. The photometry part measures the intensity of the external light within the photographic visual field. The results of the measurement are used to control an automatic exposure (AE control.)

The lens barrel 13 has a zoom cam (not shown) for step zooming which is provided with cam curves including zooming portions for changing the magnification of the taking lens 12 in a plurality of steps and focusing portions for focusing the taking lens 12 according to the magnification. By driving the zoom cam, both the magnification and the focus can be adjusted, that is, the step zooming can be performed. The magnification can be selected by operating a zoom button (not shown), which is provided at the back of the camera 10.

When the zoom button is operated, a motor (not shown) is driven and a rotating force of the motor is transmitted to the zoom cam of the taking lens 12 and a finder cam for moving movable lenses of the zoom finder, via a plurality of gears. A user can select a desired magnification by operating the zoom button, and can observe a visual field which is substantially equal to a photographing angle of view through an eyepiece of the zoom finder.

FIG. 2 is a perspective view illustrating the zoom finder 30, which is incorporated into the camera 10. An AF light-acceptor housing part 32 facing the AF light-acceptor window 22, an AF light-projector housing part 34 facing the AF light-projector window 18, and a front lens 36 facing the finder objective window 16 are arranged in order from the left in a unit frame 31 of the zoom finder 30.

The unit frame 31 is divided into the first housing frame 40 and the second housing frame 70. The AF part consisting of the AF light-projecting part and the AF light-accepting part, and an objective optical system of the zoom finder 30 including the front lens 36 and a movable lens group 38 are housed in the first housing frame 40 to form the first block. On the other hand, a prism 72, the eyepiece 74, etc. are housed in the second housing frame 70 to form the second block.

FIG. 3 is an exploded perspective view of the first block. As shown in FIG. 3, the first block is constructed in such a way that the objective optical system of the zoom finder 30 and a driving mechanism of the movable lens group 38 in the objective optical system are mounted in the first housing frame 40.

The front lens 36 of the objective optical system is mounted in an objective opening 40*a*, which is formed on the front face of the first housing frame 40. The movable lens group 38, which changes the finder magnification, is composed of two movable lenses 42, 43, and the movable lens group 38 is received in a groove 45 behind the front lens 36. A mask member 47 is provided between the movable lenses 42, 43.

Flat parts 51, 52 are formed at the right and left edges, respectively, of the movable lenses 42, 43. Projections 51A are formed on the flat parts 51, and guide holes 54, 55 are formed in the flat parts 52. A guide shaft 56 is inserted into the guide holes 54, 55, and the guide shaft 56 is parallel to the optical axis of the movable lens group 38. The front end of the guide shaft 56 is thrust into a hole 40*b* which is formed on the front wall of the first housing frame 40, and the rear end of the guide shaft 56 is thrust into a hole 40*b* which is formed on the rear wall of the first housing frame 40. The guide shaft 56 is thereby fixed at the position.

Figure 4:
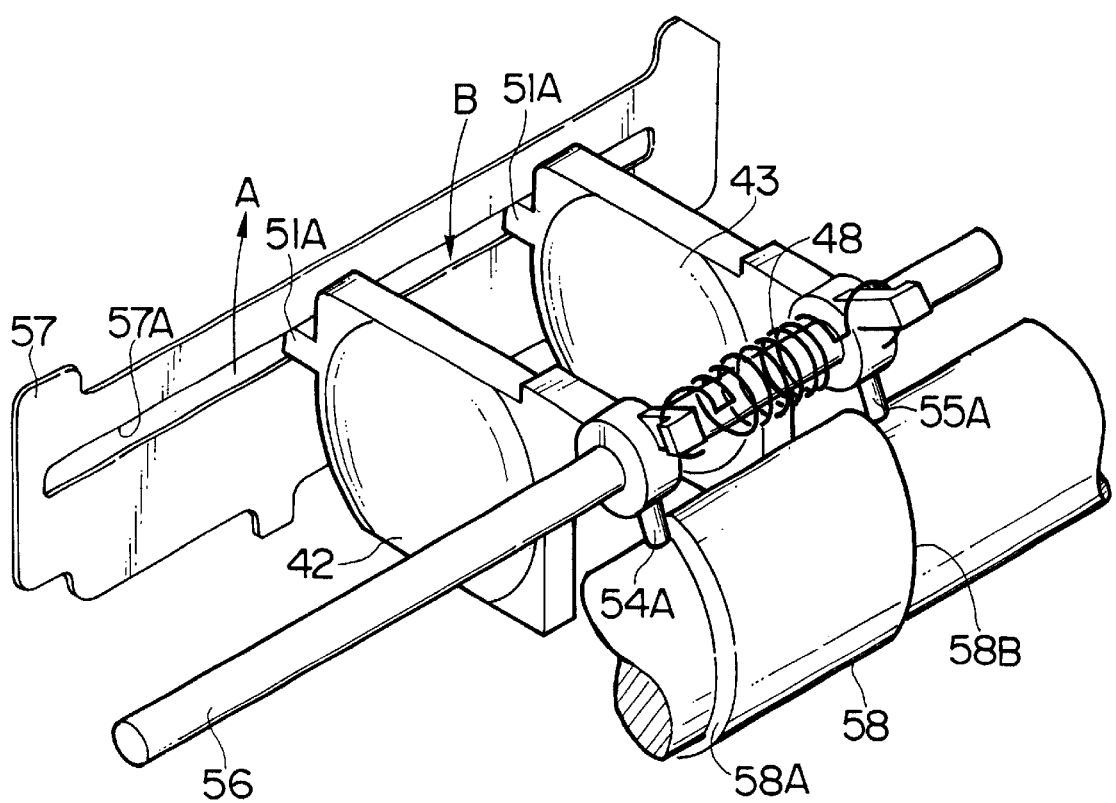
FIG. 4 is an enlarged perspective view illustrating the essential parts of the zoom finder of the present invention.

On the first housing frame 40, a rotation preventive plate 57 is arranged at the left side of the groove 45 receiving the movable lenses 42, 43. A straight groove 57A is formed on the rotation preventive plate 57, and the projections 51A of the movable lenses 42, 43 engage with the straight groove 57A. The rotation preventive plate 57 is fixed between the first housing frame 40 and an objective cover 41. Thus, as shown in FIG. 4, the movable lenses 42, 43 can move in the direction of the optical axis, and they are almost prevented from rotating around the guide shaft 56.

The guide shaft 56 perfectly fits in the guide holes 54, 55 of the movable lenses 42, 43, preferably; however, there is some looseness between the projections 51A of the movable lenses 42, 43 and the straight groove 57A on the rotation preventive plate 57. The looseness allows the movable lenses 42, 43 to rotate a little around the guide shaft 56, and hence the image observed through the zoom finder 30 may shift as a result of the rotation of the movable lenses 42, 43. As described later, the present invention effectively prevents the movable lenses 42, 43 from rotating and thereby prevents the image from shifting.

Follower pins 54A, 55A project from the side of the movable lenses 42, 43, and engage with the finder cam 58. As stated previously, a rotating force of the motor, which also drives the taking lens barrel 13, is transmitted to the finder cam 58 via a gear train (not shown) and a gear 59A which is connected to the finder cam 58. Cam faces 58A, 58B, which determine the optical positional relationship between the movable lenses 42, 43, are formed on an outer peripheral surface of the finder cam 58. Both ends of the finder cam 58 are thrust into holes 40*c* which are formed on the first housing frame 40. A gear 59B at the back of the finder cam 58 is linked to a strobe mechanism (not shown).

The follower pin 54A of the movable lens 42 is in contact with the front cam face 58A of the finder cam 58, and the follower pin 55A of the movable lens 43 is in contact with the rear cam face 58B of the finder cam 58. L-shaped hooks 54B, 55B are formed at the top of the movable lenses 42, 43, and a tension spring 48 is stretched between the hooks 54B, 55B. The follower pins 54A, 55A are pressed against the cam faces 58A, 58B, respectively, by the tension spring 48. Thus, the relative positions of the movable lenses 42, 43 are regulated (see FIG. 4.)

As stated previously, the motor driving the taking lens barrel 13 also drives the finder cam 58. Then, when the motor is driven, the finder cam 58 rotates in connection with the taking lens barrel 13. Thus, the finder visual field corresponds to the photographing angle of view.

On the other hand, as shown in FIG. 2, the second block is constructed in such a way that the prism 72 operating as an erecting optical system, a mirror 83, a visual field frame 75, a field lens 82 and the eyepiece 74 are housed in the second housing frame 70. In order to attach the second block to the bottom of the first block, projections 70d which are formed on the second housing frame 70 are put into holes 40d (see FIG. 3) which are formed in the first housing frame 40. Moreover, holes 40e (see FIG. 3) of the first housing frame 40 and holes 70e (see FIG. 2) of the second housing frame 70 are put together, and then they are connected by screws.

A description will hereunder be given of the construction which prevents the image from shifting which results from the looseness between the projections 51A of the movable lenses 42, 43 and the straight groove 57A on the rotation preventive plate 57.

FIGS. 5(A) and 5(B) are views illustrating in detail the construction of the finder cam 58, and FIGS. 5 (A) and 5 (B) are a plan view and a development view, respectively, of the finder cam 58. As shown in FIG. 5 (B), the cam faces 58A, 58B of the finder cam 58 incline to one side over the whole area which is used. That is, the cam faces 58A, 58B are formed in such a way that both cam curves 58A, 58B in FIG. 5 (B), which respectively correspond to the cam faces 58A, 58B, monotonically descend from a wide end to a telephoto end.

The follower pins 54A, 55A of the movable lenses 42, 43 are pressed against the cam faces 58A, 58B by a force F of the tension spring 48. The force F applied to the follower pin 54A can be divided into a component $F_a$ in the direction of the tangent line of the cam face 58A at a contact point, where the follower pin 54A is in contact with the cam face 58A, and a component $F_b$ in the direction of the normal line of the cam face 58A at the contact point. Since the cam face 58A inclines to one side, the component $F_a$ is always directed to one side (i.e. to the left in FIG. 5 (B).) Likewise, the force F applied to the follower pin 55A can be divided into a component $F_a$ in the direction of the tangent line of the cam face 58B at a contact point, where the follower pin 55A is in contact with the cam face 58B, and a component $F_b$ in the direction of the normal line of the cam face 58B at the contact point. Since the cam face 58B inclines to one side, the component $F_a$ is always directed to one side (i.e. to the right in FIG. 5 (B).)

A description will hereunder be given of the operation of the component $F_a$ to the movable lens 42.

Figure 6:
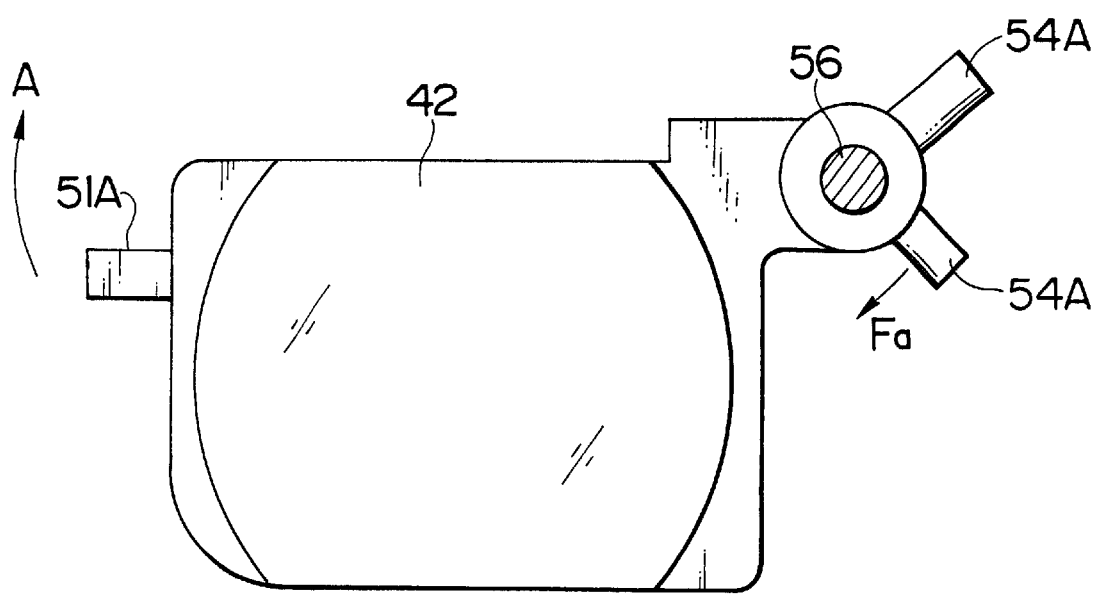
FIG. 6 is a front view illustrating the essential parts of the zoom finder for use in explaining the operation of the present invention.

As shown in FIG. 6, the component $F_a$ applied to the follower pin 54A operates to rotate the movable lens 42 clockwise around the guide shaft 56. Thus, the projection 51A at the end of the movable lens 42 is lifted in the direction of an arrow A in FIG. 6. Since the projection 51A is inserted in the straight groove 57A on the rotation preventive plate 57, the projection 51A comes in contact with the top of the straight groove 57A.

On the other hand, when the finder cam 58 rotates, a frictional force is applied to the follower pin 54A from the cam face 58A, and the frictional force operates to rotate the movable lens 42 around the guide shaft 56. The frictional force switches its directions according to the rotating direction of the finder cam 58. By making the component $F_a$ larger than the frictional force, the projection 5 1A of the movable lens 42 can be in contact with the top of the straight groove 57A on the rotation preventive plate 57. The component $F_a$ depends on an angle of inclination of the cam face 58A, and the frictional force depends on the angle of inclination of the cam face 58A and a coefficient of friction between the cam face 58A and the follower pin 54A. The cam face 58A is designed so that the component $F_a$ can always be larger than the frictional force. Consequently, the projection 51A of the movable lens 42 can always be in contact with the top of the straight groove 57A on the rotation preventive plate 57.

Likewise, the movable lens 43, in which the follower pin 55A is pressed against the cam face 58B, is rotated in the direction of an arrow B in FIG. 4 by the component $F_a$ applied to the follower pin 55A. The cam face 58B is designed so that the component $F_a$ can always be larger than a frictional force applied to the follower pin 55A from the cam face 58B. Consequently, the projection 51A of the movable lens 43 can always be in contact with the bottom of the straight groove 57A on the rotation preventive plate 57.

Since the camera which uses the zoom finder 30 performs the step zooming, the taking lens 12 is driven by the zoom cam for step zooming in order to adjust the focus even after the focal length of the taking lens 12 reaches the selected focal length. Thus, the finder cam 58 rotates, too. For example, as shown in FIG. 5 (B), when the taking lens 12 positions at the telephoto end, the finder cam 58 moves with respect to the follower pins 54A, 55A within the area L so as to adjust the focus according to the photographic length. That is, even if the finder cam 58 moves back and forth within the area L corresponding to the focus adjustment area of the taking lens 12, the projections 51A of the movable lenses 42, 43 are always in contact with the top and bottom surfaces, respectively, of the straight groove 57A on the rotation preventive plate 57. Thereby, the movable lenses 42, 43 can be prevented from rotating, and thus the image can be prevented from shifting.

In this embodiment, two cam faces of the finder cam, with which the follower pins of two movable lenses are in contact, are inclined in one direction; however, only one of them may be inclined in one direction. In this case, the shifting of the image can be reduced by half. A direction in which the pressing member presses the movable lens against the cam face of the finder cam is not restricted to this embodiment. The pressing member may press the movable lens in any direction in that a pressing force component in the direction of a tangent line of the cam face is always larger than a frictional force produced between the cam face and the follower pin. Furthermore, the present invention can also be applied to a camera other than the camera which performs the step zooming.

As set forth hereinabove, according to the zoom finder of the present invention, the cam face of the finder cam is inclined, over the whole area for use, in one direction with respect to the direction in which the pressing force is applied to the movable lens, so that the component of the pressing force in the direction of the tangent line of the cam face can always direct one side. For this reason, the end of the movable lens can always be in contact with the regulating face of the rotation preventive member, and the image can easily be prevented from shifting without increasing the number of parts. If the present invention is applied to the camera which performs the step zooming, the image can be prevented form shifting when the focus is adjusted, and the shifting of the image can be made inconspicuous because the magnification of the finder image slightly changes.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A zoom finder comprising:

first and second movable lenses composing a variable magnification optical system of said zoom finder, each of said first and second movable lenses being provided with a guide hole, an engaging part and a cam follower;

a guide shaft for supporting said first and second movable lenses movably along an optical axis of said variable magnification optical system, said guide shaft being arranged parallel to the optical axis and being inserted into said guide holes of said first and second movable lenses;

a rotation preventive member for preventing said first and second movable lenses from rotating around said guide shaft by engaging with said engaging parts of said first and second movable lenses, said rotation preventive member being arranged parallel to the optical axis;

a finder cam for moving said first and second movable lenses along the optical axis by moving first and second cam faces which are provided at said finder cam and are respectively in contact with said cam followers of said first and second movable lenses;

a pressing member for pressing said cam followers of said first and second movable lenses against said first and second cam faces of said finder cam; and wherein at least one of said first and second cam faces of said finder cam inclines, over the whole area for use, to one side with respect to a direction in which a pressing force of said pressing member is applied to the cam follower of at least one of said first and second movable lenses which is in contact with said at least one of said first and second cam faces, so that the engaging part of said at least one of said first and second movable lenses can always be in contact with said rotation preventive member by operation of a component of the pressing force of said pressing member in a direction of a tangent line of said at least one of said first and second cam faces at a point where said at least one of said first and second cam faces is in contact with said cam follower of said at least one of said first and second movable lenses.

2. The zoom finder as defined in claim 1, wherein the zoom finder is applied to a camera which switches a focal length of a taking lens in a plurality of steps by means of a zoom cam for step zooming and focuses said taking lens according to the focal length by means of said zoom cam, said zoom cam and said finder cam being driven by the same driving means.

3. The zoom finder as defined in claim 1, wherein said engaging parts of said first and second movable lenses are projections, and said rotation preventive member is a plate on which a straight groove is formed parallel to the optical axis, said projections being inserted in said straight groove.

4. The zoom finder as defined in claim 1, wherein said finder cam is a cylindrical cam which has a rotary axis parallel to the optical axis, said first and second cam faces are provided on a periphery of said cylindrical cam and face one another, and said pressing member is a tension coil spring which is stretched between said first and second movable lenses.

5. A zoom finder comprising:

first and second movable lenses composing a variable magnification optical system of said zoom finder, each of said first and second movable lenses being provided with a guide hole, an engaging part and a cam follower;

a guide shaft for supporting said first and second movable lenses movably along an optical axis of said variable magnification optical system, said guide shaft being arranged parallel to the optical axis and being inserted into said guide holes of said first and second movable lenses;

a rotation preventive member for preventing said first and second movable lenses from rotating around said guide shaft by engaging with said engaging parts of said first and second movable lenses, said rotation preventive member being arranged parallel to the optical axis;

a finder cam for moving said first and second movable lenses along the optical axis by moving first and second cam faces which are provided at said finder cam and are respectively in contact with said cam followers of said first and second movable lenses, said first cam face of said finder cam inclining toward one end of said finder cam over an entire range of movement of said cam follower of said first movable lens along said first cam face; and a pressing member for pressing said cam followers of said first and second movable lenses against said first and second cam faces of said finder cam.

6. The zoom finder as defined in claim 5, wherein a tangential component of the pressing force of said pressing member in a direction of a tangent line along said first cam face, at a point where said first cam face is in contact with said cam follower of said first movable lenses, is directed toward said one end of said cam finder.

7. The zoom finder as defined in claim 5, wherein the zoom finder is applied to a camera which switches a focal length of a taking lens in a plurality of steps by a zoom cam for step zooming and focuses said taking lens according to the focal length by means of said zoom cam, said zoom cam and said finder cam being driven by a same driving device.

8. The zoom finder as defined in claim 5, wherein said engaging parts of said first and second movable lenses are projections, and said rotation preventive member is a plate on which a straight groove is formed parallel to the optical axis, said projections being inserted in said straight groove.

9. The zoom finder as defined in claim 5, wherein said finder cam is a cylindrical cam which has a rotary axis parallel to the optical axis, and said first and second cam faces are provided on a periphery of said cylindrical cam and face one another.

10. The zoom finder as defined in claim 5, wherein pressing member is a tension coil spring which is stretched between said first and second movable lenses.

11. The zoom finder as defined in claim 5, wherein said second cam face of said finder cam inclines toward said one end of said finder cam over an entire range of movement of said cam follower of said second movable lens along said second cam face.

* * * * *